United States Patent [19]

Smilgys

[11] 4,281,240

[45] Jul. 28, 1981

[54] FUEL PUMP COUNTER TRANSFER MECHANISM

[75] Inventor: Bruno S. Smilgys, Hartford, Conn.

[73] Assignee: Veeder Industries Inc., Hartford, Conn.

[21] Appl. No.: 101,838

[22] Filed: Dec. 10, 1979

[51] Int. Cl.³ .......................... G06C 7/10; F16H 57/00

[52] U.S. Cl. .............................. 235/139 R; 235/94 R; 74/411

[58] Field of Search .................... 235/1 R, 1 C, 61 M, 235/133 R, 139 R, 144 D, 144 SP, 144 MG, 94 R, 94 A, 118, 119, 136, 117 R; 74/411, 440

[56] References Cited

U.S. PATENT DOCUMENTS

| | | | |
|---|---|---|---|
| 2,336,307 | 12/1943 | Slye | 235/139 R |
| 2,881,630 | 4/1959 | Opocensky | 235/139 R |
| 2,928,288 | 3/1960 | Bliss et al. | 74/411 |
| 2,932,448 | 4/1960 | Bliss | 235/144 SM |
| 3,496,791 | 2/1970 | Gabriel | 74/411 |
| 3,836,072 | 9/1974 | Kelch et al. | 235/136 X |
| 3,916,713 | 11/1975 | Young | 74/411 |
| 4,142,672 | 3/1979 | Smilgys | 235/144 D |

*Primary Examiner*—L. T. Hix
*Assistant Examiner*—Benjamin R. Fuller
*Attorney, Agent, or Firm*—Prutzman, Kalb, Chilton & Alix

[57] ABSTRACT

A fuel pump register cost counter having a transfer mechanism permitting count transfers at a substantially reduced torque through the use of a torsion spring drive of the transfer ring of the units wheel and the use of transfer pinions between the counter wheels having transfer gear sections with alternating involute gear teeth and non-involute resilient gear teeth providing for relatively gradually accelerating and decelerating the transfer pinion at the beginning and end of the transfer interval.

14 Claims, 2 Drawing Figures

FUEL PUMP COUNTER TRANSFER MECHANISM

DESCRIPTION

1. Technical Field

The present invention relates generally to resettable fuel pump counters of the type having a bank of resettable coaxial counter wheels and intermediate transfer pinions and more particularly relates to a new and improved transfer mechanism having notable use in such counters for transmitting transfer counts between counter wheels.

In fuel pump registers, because of the rapidly escalating cost of gasoline, the cost counters are being rotated at correspondingly increasing rates of speed (for any given volume rate of fuel delivery) and whereby the increased rate of rotation of the cost counters results in substantially increased wear and impact, particularly during the count transfer interval during which one or more transfer pinions and associated higher order counter wheels are accelerated from rest at the beginning of a transfer and decelerated to rest at the completion of the transfer. Accordingly, it is desirable to provide a transfer drive particularly between the lowest and next lowest order counter wheels of each cost counter of the fuel pump register for reducing the mechanical shock and attendant wear of the counter mechanism during the transfer interval.

2. Background Art

The prior art U.S. Pat. No. 2,928,288 of H. N. Bliss et al, dated Mar. 15, 1960 and entitled "Transfer Pinion For Counters" discloses a shock absorbing transfer pinion having bi-directional compression springs between input and output gear sections of the transfer pinion to reduce the transfer shock loading transmitted through the transfer pinion during the transfer interval. Similarly, prior art U.S. Pat. No. 2,336,307 of E. A. Sly, dated Dec. 7, 1943 and entitled "Counter" discloses a counter wheel drive gear with bi-directional torsion spring for reducing the transfer drive shock transmitted through the drive gear. A third prior art U.S. Pat. No. 3,916,713 of E. T. Young, dated Nov. 4, 1975 and entitled "Snap Action Transfer Pinion," discloses a transfer pinion with a torsion spring drive preloaded during the initial part of the transfer interval and then released to produce a rapid transfer at the end of the transfer interval.

In the foregoing prior art patents, although the disclosed transfer drive mechanisms provide for reducing the transfer shock at least at the beginning of the transfer interval, the disclosed mechanisms do not maintain the transfer drive torque within acceptable limits under high speed operating conditions.

DISCLOSURE OF INVENTION

In accordance with the present invention, a new and improved fuel pump counter transfer mechanism is provided which substantially reduces the transfer drive torque under high speed operating conditions and controls the transfer interval in accordance with the counter operating speed to reduce the mechanical shock and wear of the counter.

In addition, the transfer mechanism of the present invention enables the transfer to be transmitted during up to 108° of rotation (instead of the usual 36° of rotation) of the units counter wheel and yet ensures that each transfer is completed well before the succeeding transfer begins.

Further, the new and improved fuel pump counter transfer mechanism of the present invention employs a new and improved transfer pinion which provides for reducing transfer shock and for smoothly accelerating and decelerating the transfer drive at the beginning and end of the transfer interval.

Other objects will be in part obvious and in part pointed out more in detail hereinafter.

A better understanding of the invention will be obtained from the following detailed description and the accompanying drawings of illustrative applications of the invention.

BEST MODE FOR CARRYING OUT THE INVENTION

Figure 1:
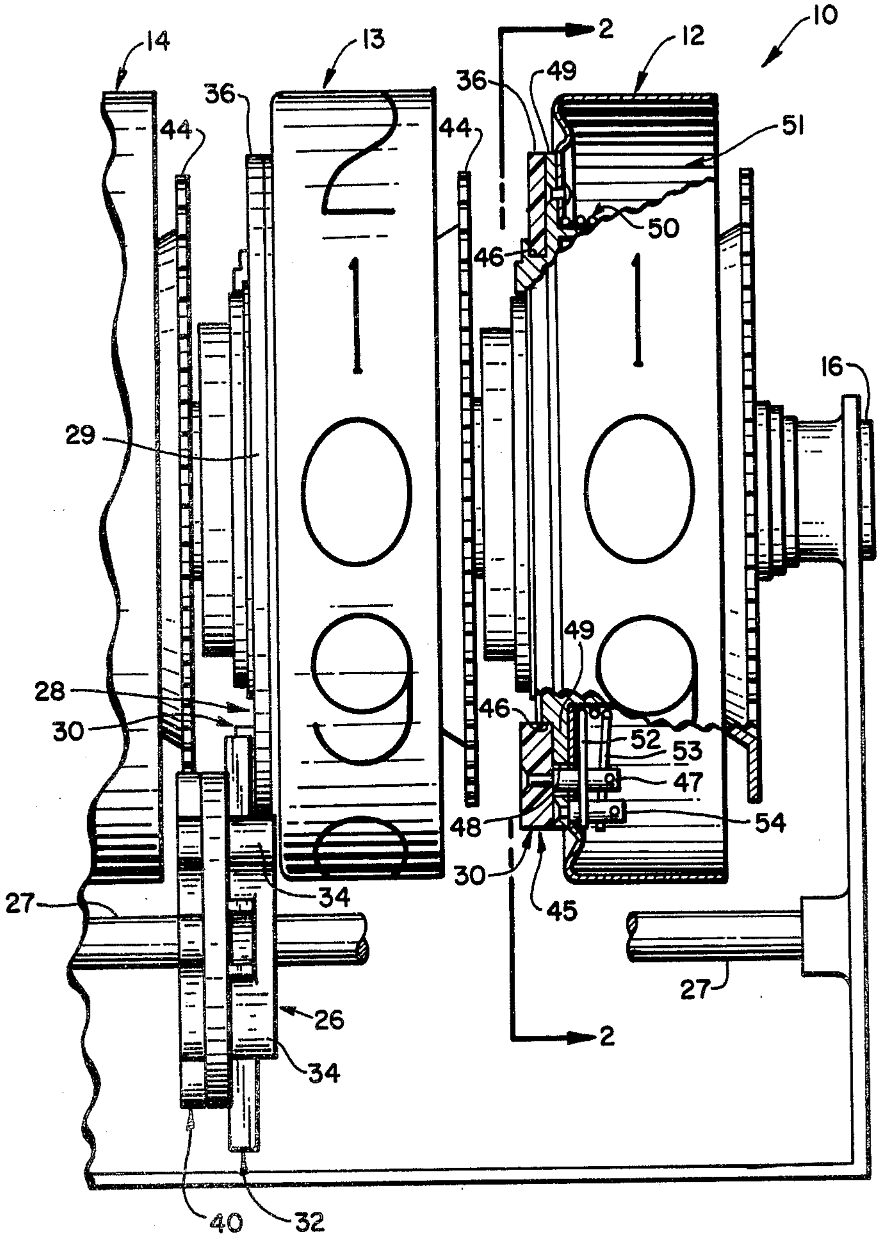
FIG. 1 is a front elevation view, partly broken away and partly in section, of a fuel pump register cost counter incorporating an embodiment of a transfer mechanism of the present invention.

Referring now to the drawings in detail, wherein like reference numerals indicate like parts, there is shown a fuel pump register cost counter 10 of the type shown in U.S. Pat. No. 2,932,448 of H. N. Bliss, dated Apr. 12, 1960, and entitled "Resetting Mechanism for Counters" and may be identical to the resettable cost counter shown in U.S. Pat. No. 2,932,448 excepting as hereinafter described. Although the cost counter 10 will therefore not be described in detail, briefly, the cost counter 10 comprises a bank of four coaxial decade counter wheels (of which only three counter wheels 12–14 are shown) of increasing order of significance mounted on a counter wheel shaft 16 and adapted to be driven for registering the accumulated cost amount of fuel delivered up to $99.99. Also, excepting as hereinafter described the resettable cost counter wheels may be generally identical to that shown and described in U.S. Pat. No. 4,142,672 of B. S. Smilgys, dated Mar. 6, 1979 and entitled "Counter Wheel Assembly with Improved Reset Control Mechanism."

Transfer pinions 26 constructed in accordance with the present invention are rotatably mounted on a transfer pinion shaft 27 between adjacent counter wheels for transmitting a transfer or count from each lower order decade wheel to the adjacent higher order decade wheel. The second or tens decade wheel 13 (and each higher order wheel) has a transfer ring 28 with a combined locking ring 29 and two-tooth transfer gear segment 30 (modified in accordance with the present invention), and the transfer ring 28 is engageable with a mutilated, eight-tooth input or transfer gear section 32 of the hundreds transfer pinion 26 for indexing the transfer pinion 26 a predetermined angle, 90° in the counterclockwise direction as viewed in FIG. 2, as the tens counter wheel 13 is indexed approximately but greater than one count from "9" to "0" (48° in the shown embodiment of the present invention), in the clockwise direction as viewed from the left side of the tens counter wheel 13. An eight-tooth output or drive gear section 40 of the hundreds transfer pinion 26 engages the wheel drive gear 44 of the hundreds decade wheel 14 to rotate the hundreds wheel 14 one count or 36° as the hundreds transfer pinion 26 is rotated 90°. Between transfers, the alternate conventional wide teeth 34 of the mutilated, eight-tooth input gear section 32 of the hundreds transfer pinion 26 engage the outer cylindrical surface 36 of the tens wheel locking ring 29 to lock the hundreds transfer pinion 26 against rotation.

The first or units decade wheel 12 comprises a transfer ring 45 with a locking ring 29 and a two-tooth transfer gear segment 30 which engages the respective tens transfer pinion 26 to intermittently rotate the tens transfer pinion 90° and thereby index the tens decade wheel 13 as described with reference to the hundreds transfer pinion 26. However, in the units wheel 12 the transfer ring 45 is mounted on a cylindrical hub or shoulder 46 of the units indicia wheel 51 for 120° limited coaxial rotation established by the engagement of an axial pin 47 of the transfer ring 45 with the ends of an angular slot 48 in a radial flange 49 of the units indicia wheel 51.

A coil torsion spring 50 generally coaxially mounted within the units wheel 12 has radial end tangs 52, 53 at the ends thereof engageable with the transfer ring pin 47 and also with a second axial pin 54 mounted on the wheel flange 49 immediately outwardly of the slot 48. The torsion spring 50 is preloaded by contracting the spring (for example by relative rotation of the end tangs 52, 53 of the torsion spring approximately 180°) and whereby the units wheel transfer ring 45 is rotatable in both angular directions by the torsion spring bias to an angular position established by the wheel pin 54. Also, the wheel pin 54 is preferably angularly located intermediate the ends of the angular slot 48 so that the transfer ring 45 is rotatable from its normal position shown in FIG. 2 up to 60° in either angular direction.

The torsion spring 50 is preloaded a predetermined amount, is dependent on the spring rate, by the 180° preload rotation of the torsion spring 50, and the torsion spring bias is increased by an approximately additional one-third by 60° rotation of the transfer ring 45 relative to the units indicia wheel 51 in either angular direction.

Figure 2:
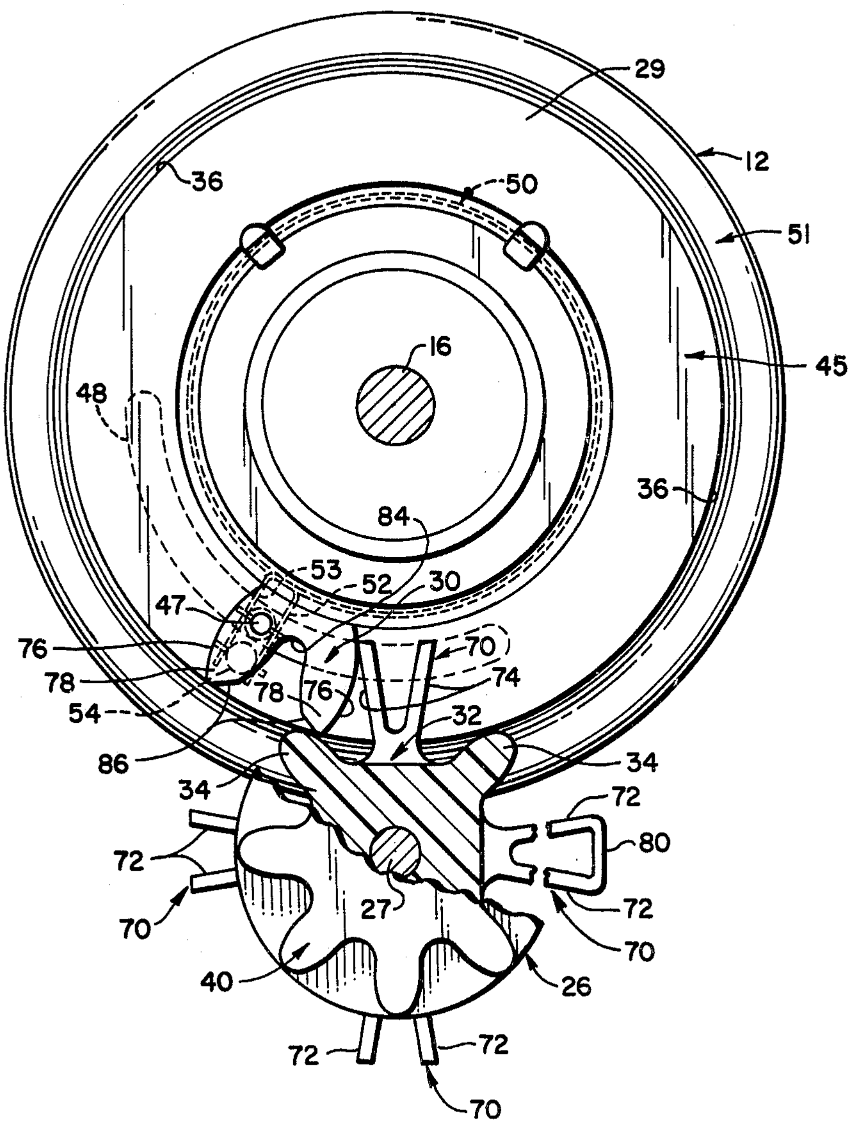
FIG. 2 is an enlarged transverse section view, partly broken away and partly in section, of the cost counter taken generally along line 2—2 of FIG. 1.

Referring particularly to FIG. 2, in the transfer pinion 26 of the present invention, the four alternate relatively narrow teeth 70 of the input gear section 32 are formed with radially projecting or elongated resilient leg portions 72 which provide leading and trailing tooth edges 74 (having a straight tooth edge profile in the shown embodiment) engageable with the leading and trailing tooth edges 76 respectively of the two-tooth transfer gear segment 30.

The elongated resilient leg portions 72 of each tooth 70 are circumferentially resilient along their entire length and may be unconnected at their outer ends (as shown in the case of three of the teeth 70) or may be connected at their outer ends with an integral bridge portion 80 (as shown in the case of one of the teeth 70) to facilitate molding the transfer pinion 26 and to strengthen the outer ends of the resilient leg portions 72 against excessive deflection upon engagement with the transfer gear segment 30.

The alternate wide teeth 34 of the transfer pinion 26 have a conventional involute tooth form and the transfer gear segment 30 has a conventional involute tooth form excepting that the leading and trailing involute tooth edges 76 extend radially inwardly to accommodate engagement inwardly of their root circle with the elongated leading and trailing edges 74 of the resilient leg portions 72 of the teeth 70. Also, each tooth 78 of the two-tooth segment 30 is modified to provide a generally flattened inner apex edge section 86 for intermeshing with an involute tooth 34 of the transfer pinion 26 up to approximately 6° before and 6° after conventional involute gear intermeshing engagement. In addition, the resilient leg portions 72 flair outwardly to engage the two tooth gear segment 30 as shown in FIG. 2 approximately 6° in advance and 6° after conventional 36° intermeshing engagement and whereby the transfer engagement of the gear segment 30 with the transfer pinion 26 takes place over approximately 48° of angular rotation of the transfer ring 45.

The leg portions 72 are elongated to initially engage the involute leading edge 76 of the transfer segment teeth 78 inwardly of the root circle of the teeth 78 and have a tooth form so that the transfer pinion 26 is relatively gradually accelerated from rest to the constant speed of intermeshing involute teeth and relatively gradually decelerated to rest at the end of a transfer. In addition, the tooth resiliency provides for absorbing some of the acceleration and deceleration shock to help smoothly accelerate the transfer pinion 26 from and decelerate it to its rest position between transfers.

At relatively low counting speeds and concomitant low rates of rotation of the units wheel 12, a transfer is transmitted to the tens wheel 13 from the units wheel 12 with little or no angular displacement of the transfer ring 45 and little or no circumferential deflection of the resilient legs 72 and whereby the transfer begins approximately 6° before and ends approximately 6° after a normal 36° transfer. However, at relatively high counting speeds when the units counter wheel 12 is rotating at a relatively high rate, the resilient leg portions 72 are deflected at the beginning and end of the transfer interval to reduce the rate of acceleration and deceleration of the transfer pinion. Also, at relatively high counting speeds, the transfer segment 30 is angularly displaced against the bias of the torsion spring 50 to increase the transfer interval by up to 60° rotation of the units wheel 12. At the end of the transfer interval, the transfer segment 30 is returned quickly to its normal position shown in FIG. 2 by the torsion spring 50 to bring the transfer pinion 26 to rest well before the beginning of the succeeding transfer.

In the cost counter 10 shown in FIG. 1, the counter wheels rotate downwardly as viewed from in front of the cost counter and in the clockwise direction as viewed in FIG. 2. The cost counter wheels of the cost counter (not shown) on the opposite side of the fuel pump register rotate in the opposite angular direction, upwardly as viewed from in front of the cost counter. In that case, the transfer pinion 26 and units wheel transfer ring 45 function in exactly the same manner as described except that they rotate in the opposite angular direction. And for that reason, the units wheel transfer ring 45 is mounted for angular deflection in both angular directions from its intermediate rest position shown in FIG. 2.

In operation, the transfer ring 45 is adapted to rotate relative to the rest of the units wheel 12 up to 60° during the transfer of a count from the units wheel 12 to the tens wheel 13. Also, since a count transfer is transmitted during 48° rotation of the transfer ring 45 (i.e. the angle of engagement of the transfer gear segment 30 with the transfer pinion 26), the units wheel 12 can rotate through a transfer angle of up to 108° to complete a transfer to the tens wheel 13.

By appropriate selection of the spring rate and preload of the torsion spring 50, the transfer to the tens wheel 13 is transmitted to ensure that the transfer is completed and the tens wheel 13 comes to a rest within the available 108° rotation of the units wheel 12 and whereby each tens transfer is transmitted smoothly and evenly from the units wheel 12. Also, the hundreds transfer pinion 26 between the tens and hundreds wheels 13, 14 provides for minimizing transfer shock and wear accompanying transfers to the hundreds decade wheel 14 in the manner of the tens transfer pinion 26. In addition, the units wheel transfer ring 45 cushions the transfers to all of the higher order wheels 13, 14 etc.

As will be apparent to persons skilled in the art, various modifications, adaptations and variations of the foregoing specific disclosure can be made without departing from the teachings of the present invention.

I claim:

1. In a rotary counter having at least two coaxial counter wheels of ascending order of significance adapted to be rotated in a first angular direction thereof for accumulating a count, each pair of adjacent counter wheels of higher and lower order having respectively a wheel drive gear and a transfer ring with a two-tooth transfer gear segment and locking ring, and a rotary transfer pinion intermediate each pair of adjacent counter wheels of higher and lower order having an input gear section with an even plurality of teeth in operative engagement with the transfer ring of the lower order counter wheel and an output gear section with an even plurality of teeth in operative engagement with the drive gear of the higher order counter wheel and whereby the transfer pinion is intermittently angularly indexed a predetermined transfer angle thereof by rotation of the lower order counter wheel in said first angular direction, for indexing the higher order counter wheel one count in said first angular direction, the improvement wherein at least the tens transfer pinion intermediate the lowest and next lowest order counter wheels is a special transfer pinion having an input gear section with first alternate teeth and second different elongated alternate teeth extending radially outwardly of the first teeth and having a tooth profile for initial engagement with and disengagement from the leading and trailing edges of the two-tooth gear segment radially inwardly of the root circle thereof to reduce the rate of acceleration and deceleration of the transfer pinion at the beginning and end of its transfer angle.

2. A rotary counter according to claim 1 wherein said second alternate teeth are circumferentially resilient.

3. A rotary counter according to claim 2 wherein the second alternate teeth each comprise a pair of generally radially outwardly extending and circumferentially outwardly flairing resilient leg portions.

4. A rotary counter according to claim 3 wherein the second alternate teeth each comprise an integral bridge portion interconnecting the outer ends of the resilient leg portions.

5. A rotary counter according to claim 1, 2, 3 or 4 wherein all of the transfer pinions of the counter are said special transfer pinions.

6. A rotary counter according to claim 1, 2, 3 or 4 wherein the first alternate teeth have generally involute tooth profiles.

7. A rotary counter according to claim 1, 2, 3 or 4 wherein the lowest order counter wheel comprises means for mounting its transfer ring for relative coaxial angular displacement from a first relative angular position thereof in at least the angular direction opposite to said first angular direction, and torsion spring means for relatively angularly biasing the transfer ring in said first angular direction to its first relative angular position.

8. In a transfer pinion for use in a rotary counter for transmitting a transfer count from a lower order counter wheel to a higher order counter wheel via a combined two-tooth transfer segment and locking ring of the lower order counter wheel and a drive gear of the higher order counter wheel, the transfer pinion comprising input and output gear sections, each having an even plurality of gear teeth, for engagement with a combined transfer segment and locking ring of a lower order counter wheel and a drive gear of a higher order counter wheel respectively for transmitting a transfer count from the lower to the higher order counter wheel, the improvement wherein the input gear section comprises first alternate generally involute gear teeth and second alternate gear teeth extending radially outwardly of the generally involute teeth to engage a transfer gear segment of a lower order counter wheel radially inwardly of the root circle of the gear segment.

9. A transfer pinion according to claim 8 wherein the second alternate gear teeth are non-involute teeth.

10. A transfer pinion according to claim 8 or 9 wherein the second alternate gear teeth are circumferentially resilient.

11. A transfer pinion according to claim 10 wherein the second alternate gear teeth each comprises a pair of radially outwardly extending resilient leg portions.

12. In a rotary counter having at least two coaxial counter wheels of ascending order of significance adapted to be rotated in a first angular direction thereof for accumulating a count, each pair of adjacent counter wheels of higher and lower order having respectively a wheel drive gear and a transfer ring with a two-tooth transfer gear segment and locking ring, and a rotary transfer pinion intermediate each pair of adjacent counter wheels of higher and lower order in operative engagement with the transfer ring of the lower order counter wheel and with the drive gear of the higher order counter wheel and whereby the transfer pinion is intermittently angularly indexed a predetermined transfer angle thereof by rotation of the lower order counter wheel in said first angular direction, for indexing the higher order counter wheel one count in said first angular direction, the improvement wherein the lowest order counter wheel comprises means for mounting its transfer ring for relative coaxial angular displacement from a first relative angular position thereof in at least the angular direction opposite to said first angular direction, and torsion spring means for relatively angularly biasing the transfer ring in said first angular direction to its said first relative angular position.

13. A rotary counter according to claim 12 wherein the mounting means provides for mounting the lowest order counter wheel transfer ring for relative coaxial displacement from said first relative angular position in both angular directions, and wherein the torsion spring means provides for relatively angularly biasing the transfer ring in both angular directions to its said first relative angular position.

14. A rotary counter according to claim 12 or 13 wherein the mounting means comprises limit means for limiting the relative coaxial displacement of the lowest order counter wheel transfer ring in said opposite angular direction from its said first relative angular position.

* * * * *